United States Patent [19]

Ridenour et al.

[11] 4,104,504

[45] Aug. 1, 1978

[54] WELDING MANGANESE STEEL

[75] Inventors: Charles E. Ridenour, Chicago Heights; Herman A. Fabert, Jr., Homewood, both of Ill.; John Tasker, West Milford; Hugo R. Larson, Ridgewood, both of N.J.

[73] Assignee: Abex Corporation, New York, N.Y.

[21] Appl. No.: 799,567

[22] Filed: May 23, 1977

Related U.S. Application Data

[63] Continuation-in-part of Ser. No. 613,040, Sep. 12, 1975, abandoned.

[51] Int. Cl.² ............................................. B23K 9/18
[52] U.S. Cl. ................................ 219/73.1; 219/145.1; 219/146.1
[58] Field of Search .................. 219/73 A, 126, 145, 219/146, 136

[56] References Cited

U.S. PATENT DOCUMENTS

| 1,794,983 | 3/1931 | Ritter | 219/145 |
| 3,200,232 | 8/1965 | Danhier | 219/73 A |
| 3,258,575 | 6/1966 | Santilhano | 219/73 A |
| 3,286,075 | 11/1966 | Kautz | 219/145 X |
| 3,352,993 | 11/1967 | Suzuki | 219/73 A |
| 3,558,845 | 1/1971 | Norcross | 219/73 A |

OTHER PUBLICATIONS

Welding Hand Book Sixth Edition, Sec. 4, 1972, AWS Miami, Fla. p. 66.14.
Iron Welding Technology, 1962, Russian Boor, pp. 1-21.

*Primary Examiner*—E. A. Goldberg
*Attorney, Agent, or Firm*—Kinzer, Plyer, Dorn & McEachran

[57] ABSTRACT

Sections of cast manganese steel, or manganese steel to be interfaced to another steel, are joined by electroslag welding. Metallurgical limitations, operating parameters and physical attributes of the guide tube are imposed to retard embrittlement of the base metal and weld metal as well, to prevent tearing, to assure satisfactory ductility, and to preserve the integrity of the austenitic manganese steel in the weld metal.

42 Claims, 14 Drawing Figures

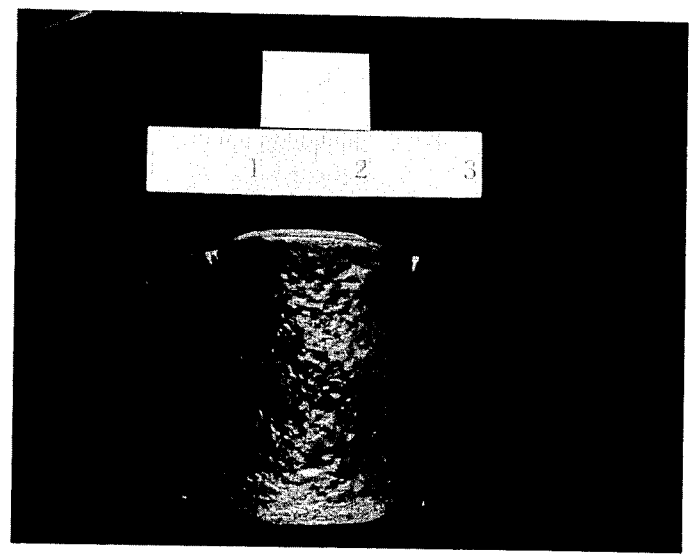
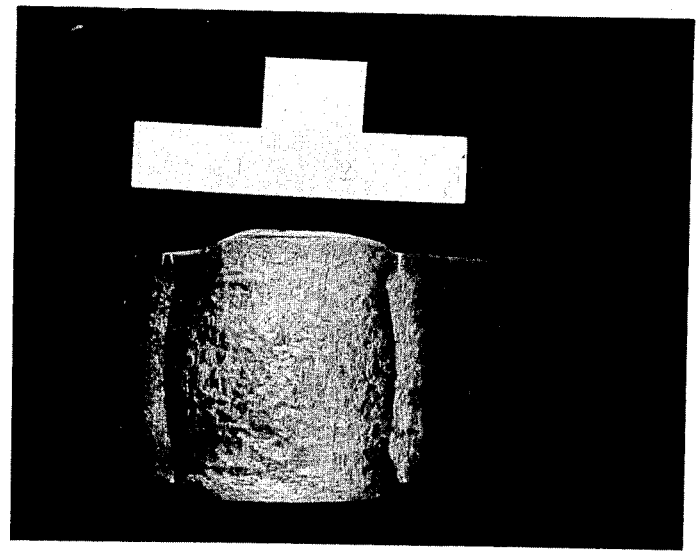
fig.6.

fig. 7.
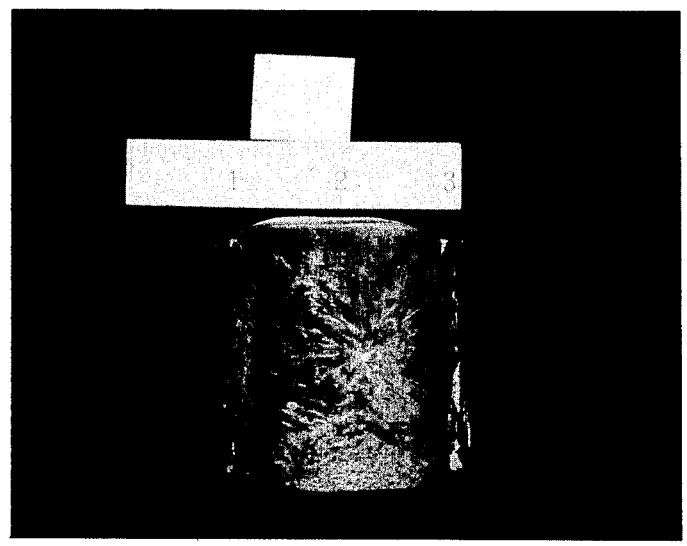
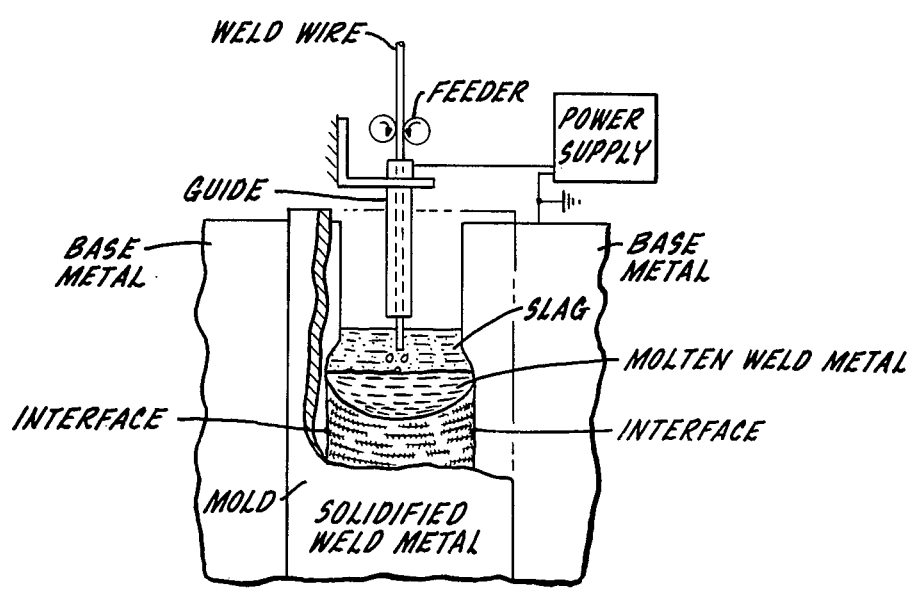
fig. 9.

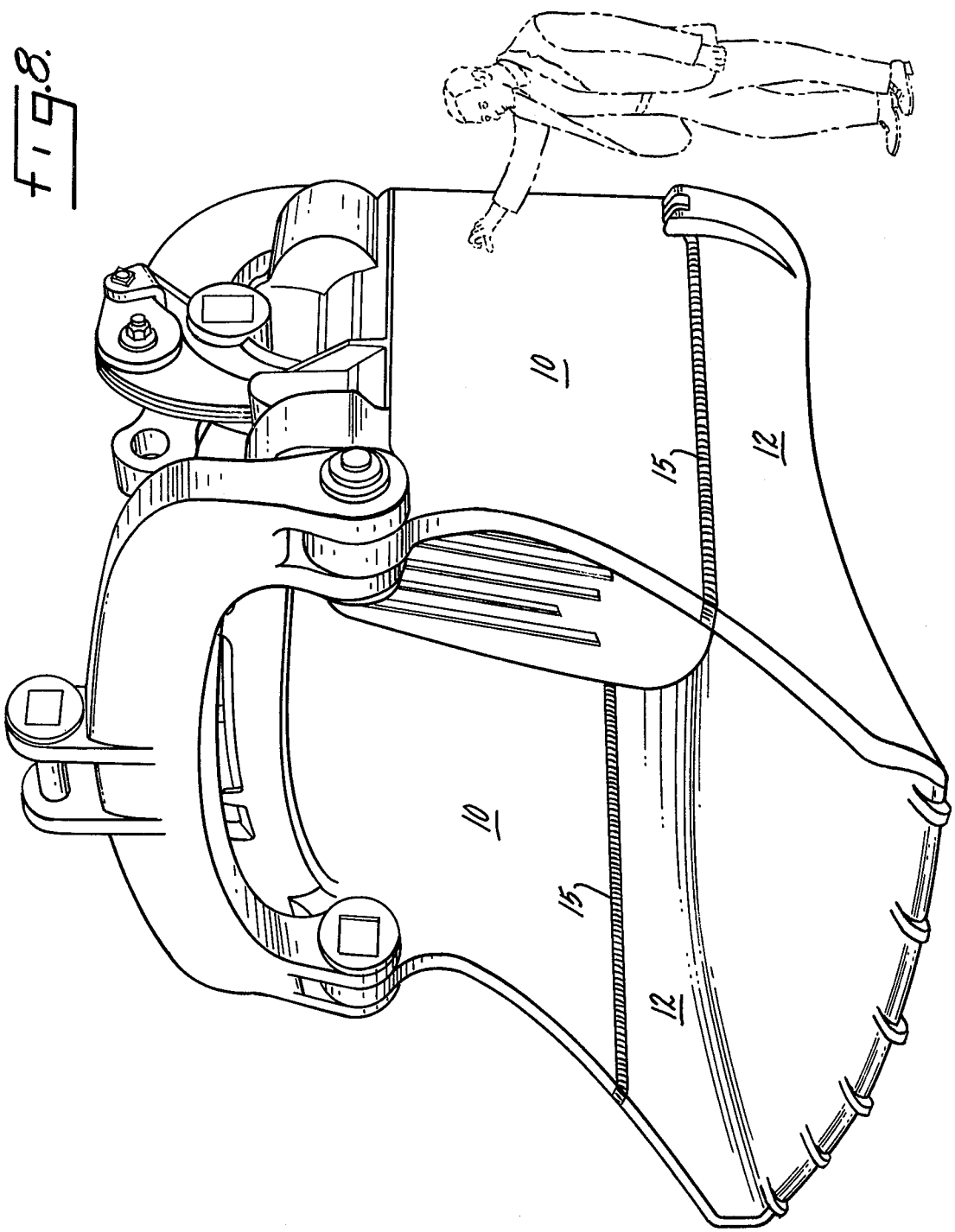

- CARBON STEEL
- HOT TEAR
- MANGANESE STEEL

- MANGANESE STEEL
- LACK OF FUSION
- CARBON STEEL

WELDING MANGANESE STEEL

This application is a continuation in part of Ser. No. 613,040 filed Sep. 12, 1975 now abandoned.

This invention relates to a method for joining sections of manganese steel and to joining a section of manganese steel to a section of another steel.

Manganese steel is used extensively in castings subjected to severe abrasion or impact: earth moving equipment, grinding mills, railroad trackwork and so on, principally because the material embodies both ductility and wear resistance.

Large parts are economically manufactured by casting several sections and joining them by welding. Proportions are becoming enormous: in metallic mining dipper buckets of 25 cubic yard capacity are employed; 30 cubic yard capacities are being planned.

The labor cost for welding becomes severe as the castings become larger: more man hours are involved, less quality can be expected and delivery dates are retarded. This is so in spite of the fact that it is customary to join the parts by semiautomatic welding techniques.

The cost problem of joining heavy sections of manganese steel castings by welding (the heavier the section the more heat in-put) is exacerbated by the embrittlement phenomonon encountered when cast, heat treated manganese steel is reheated, as will now be explained.

Austenitic manganese steel, which is also called Hadfield's manganese steel after its inventor, is an extremely tough non-magnetic alloy in which the usual hardening transformation has been suppressed by a combination of high manganese content and rapid cooling from a high heat treatment temperature. It is characterized by high strength, high ductility and excellent wear resistance and is extensively used in severe gouging, crushing, impact and grinding wear applications because the material actually gets harder the more it is worked.

The nominal composition contains 1.2% carbon and 12% or 13% manganese as essential elements. Commercial products will vary within the 1.0 – 1.4% carbon and 10 – 14% manganese ranges established by ASTM Designation A128.

The as-cast structure of manganese steel contains carbides and other transformation products that produce marked brittleness by their continuity. The standard toughening heat treatment involves austenitizing above 1832° F to place all the carbides in solution, followed by rapid cooling in water to prevent re-precipitation of the carbides.

Subsequent reheating of standard manganese steel parts is potentially more serious than for ordinary structural steels. Instead of the usual softening and increase in ductility, manganese steel will become embrittled if heated enough to induce partial transformation of the metastable austenite. As stated in the *Metals Handbook* (1961): "As a general rule manganese steel should never be heated above 500° F, either by accident or plan, unless the standard toughening treatment is to be applied". Both time and temperature are involved, lower temperatures requiring longer for impairment to develop. Only a few minutes are required at the dull red heat of 1000° to 1200° F to begin embrittlement of this steel.

Since prolonged reheating of toughened manganese steel results in embrittlement, only arc welding is currently recommended for welding manganese steel. With a covered electrode or semiautomatic welding, the welder can usually control heat in-put in such a way that no area is seriously overheated.

The problem, then, is essentially two fold. Larger sections with long weld seams entail high labor cost; thick sections (say two to three inches or more) involve a great deal of heat in-put likely to produce embrittlement.

Electroslag welding is known to be more economical than semiautomatic or manual arc welding from the standpoint of time required. However, the thermal cycles involved are discouraging to the idea of applying the process to joining sections of manganese steel.

The foregoing explains the problems we faced in recognizing the need to find a more acceptable way to join sections of manganese steel, particularly thick sections. The objects of the invention are: to use electroslag principles to supplant semiautomatic arc welding (and the other forms as well) as a method of joining cast manganese steel sections; to produce a weld of high integrity and satisfactory properties in manganese steel parts using electroslag principles; and to attain such a weld by constantly maintaining a reserve of austenite stabilizers during progression of the weld. Other objects of the invention are to incorporate austenite stabilizers in the weld wire and/or consumable guide; to reduce hot tearing in the weld metal and heat affected zone of the base metal; to enable the highest possible welding current to be used, thereby accelerating the process so that the base metal is exposed to high temperature for as little time as possible; and to reduce the likelihood of unacceptable embrittlement of the base metal. Another object of the invention is to enable a section of manganese steel to be joined by electroslag welding to an opposed section of steel which need not necessarily be manganese steel.

IN THE DRAWING

FIG. 6 shows the results of two bend tests on electroslag welds where the base metal was low in aluminum;

FIG. 7 shows damage in the base metal (bend test) caused by welding with a current of 600 amps, relying on low phosphorus and low aluminum in the base metal castings;

FIG. 8 is a perspective view of a dipper bucket which can be fabricated in accordance with the present invention;

FIG. 9 is a schematic view of an electroslag welding system as it may be used to practice the present invention;

Figure 1:
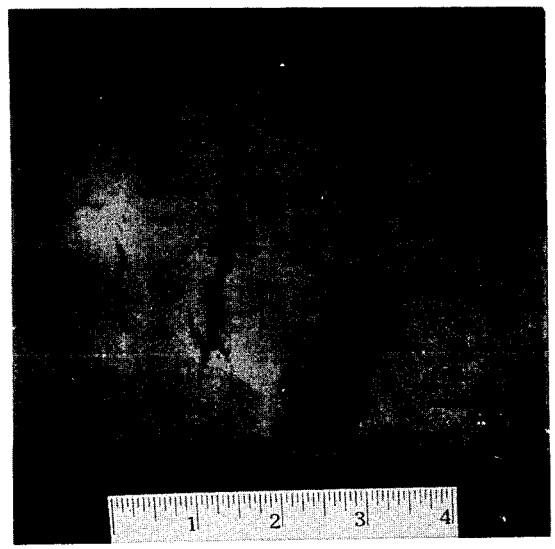
FIG. 1 shows a dye checked section of an electroslag weld, showing severe cracking in the weld metal and heat affected zone of the manganese steel base metal.

Reference may be made to FIG. 8 for a consideration of practices involved when joining sections of manganese steel by a weld. FIG. 8 is a perspective of a manganese steel dipper bucket. The middle and lower sections 10 and 12 are separate castings of manganese steel joined by a long butt weld 15. In use, any part of the bucket may be in tension. One advantage of manganese steel is its inherent ductility; it will stretch when tensioned and at the same time the tensioned area work hardens in the localized area. As a consequence the original yield strength of the pristine metal is increased. The adjacent pristine metal, not stretched, is relatively weaker. On the next occurence of tension, the adjacent areas of pristine metal yield, work harden and increase in yield strength (the same pattern as before) which is to say the increase in strength is progressive throughout a section, progressively as that section is tensioned from time to time. There is, then, a reserve of ductility in austenitic manganese steel. In field service this reserve is important in order that there will be no failure due to unexpected, abnormal tensioning. For this reason, high temperature embrittlement which depreciates the reserve in ductility cannot be tolerated.

However, by our reasoning, the reserves are large enough to tolerate some embrittlement in the heat affected zone, if controlled to an acceptable degree. But an additional factor is involved, namely, to obtain a substantially uniform profile of mechanical properties across the weld zone, taking into account the indisputable fact that the base metal has to melt as the weld metal is being deposited. We found the problem of attaining substantially matched yield strength could be resolved in principle during electroslag welding by employing a weld wire of a particular alloy content, assuming of course proper control over weld parameters.

Electroslag welding is a welding technique based on the generation of heat by passing an electrical current through molten slag. Copper shoes, normally water cooled, are used to bridge the gap (joint) of the components to be welded, thus forming a cavity to hold the molten flux. Filler metal obtained from a welding wire is fed into the molten flux and the resistance of the slag bath to the current flow provides the heat to melt the wire and the adjacent sections of the base metal. A guide tube is ordinarily used to feed the electrode wire into the molten flux and this guide tube also melts and contributes metal to the weld.

The major obstacle to successful electroslag welding of austenitic manganese steel is the vastly different time/temperature relationship of an electroslag weld as compared to a shielded metal-arc weld.

With a metal arc, the temperature of the fusion zone is relatively high instantaneously but it cools rapidly and only a very small amount of metal is at a high temperature relative to the weld. In electroslag welding, however, the temperature of the flux pool (3,000° – 4,000° F) is much lower than the temperature of a welding arc but the mass of the slag pool and molten weld metal at a high temperature is relatively large. Since a larger area of the base metal is heated in electroslag welding, both the heating and cooling rates of the metal in the heat affected zone (HAZ) are much slower in comparison to arc welding. This thermal feature of electroslag welding can be very beneficial when welding carbon and alloy steels. In these steels, the slow cooling rate considerably reduces the risk of cracks developing in the heat affected zone of the weldment. However, this characteristic thermal cycle associated with electroslag welding adversely affects the properties of austenitic manganese steel for reasons explained above.

In the first attempt to join manganese steel sections by the electroslag process, three weldments were made, one 2 inch section and two 4 inch sections, using an experimental welding wire. Otherwise, welding parameters were mainly based on experience with other steels. The base metal for two of the weldments consisted of standard manganese steel and for the third weld a grade of manganese steel containing molybdenum was used (ASTM-A-128, Grade E-1). This particular grade is known to offer better resistance to heat embrittlement than the regular grade of manganese steel.

Nonetheless, all three welding tests were unsuccessful due to severe cracking in both the weld deposit and the heat affected zone of the base metal — see FIG. 1. Microstructural examination revealed severe embrittlement of the weld and base metal and evidence of incipient melting in the base metal. In addition, large metallic inclusions were found in the weld, suspected as being unfused portions of the carbon steel guide tube normally recommended for electroslag welding.

The abnormal structure resulted in spite of the fact that the welding wire contained a relatively large amount of nickel, normally considered helpful in avoiding embrittlement of manganese steel. The nominal analysis for the wire was 0.92C, 20.8Mn, and 3.2Ni.

As will be evident from FIG. 1, extensive cracks are revealed at the interface between the weld metal and the weld. Cracks were persistent throughout the cross-section and were not confined to the exposed end surfaces. Heat damage, as evidenced by a continuous grain boundary carbide network, was observed in the base metal up to an inch from interface.

Analysis showed that melting of the base metal contributed nearly fifty percent of the weld metal, a considerable dilution. Realization of this large dilution factor, coupled with the immense heat input, could be viewed as causing catastrophic instability of austenite in the critical area. It was therefore reasoned that modifications in both the weld wire and guide tube conceivably could be relied on to preserve austenitic stability, provided heat input could be reduced.

The heat input was reduced by:
a. Reducing the root gap from 1¼ to ¾ inches;
b. Limiting the electrical parameters to 400 amps and 38 volts; and
c. Using a smaller diameter wire (1/16 instead of 3/32 inches) since a thinner wire would provide increased deposition rate for a given amperage.

The base metal was further modified to provide improved heat resisting properties, the nominal chemical analysis being:

| C % | Mn % | Mo % | Si % | P % |
| --- | --- | --- | --- | --- |
| 0.80 | 14.00 | 1.20 | 0.5 | .05 max. |

This chemical analysis still falls within ASTM specification A-128, Grade E-1.

To compensate for the tremendous dilution by the melting base metal, to introduce austenite stabilizers and in a further effort to reduce heat input, a stainless steel guide tube (SAE 304: 18Cr, 9Ni) was combined with a welding wire having the following nominal analysis: 0.9C, 18Mn, 7Cr, 6Ni. The guide tube, it was reasoned, would melt at a temperature lower than the carbon steel guide initially used; the nickel-chromium content in both the guide tube and weld wire would impart heat resistance (resistance to embrittlement of the weld metal) and would continuously contribute austenite stabilizers in the form of nickel, manganese and carbon during the progression of the weld.

These modifications in the guide tube and weld wire were determined as responsible for establishing mechanical properties across the weld satisfactorily matching those of a standard manganese steel (Y.S. 50-55000; El. 30-34) as will be evident from data obtained from this successful experimental weld set forth in Table 1:

TABLE 1

Automatic Welding of Manganese Steel
2"Section Test Weld

Base Metal

| Heat | C % | Mn % | Si % | Mo % | P% |
|---|---|---|---|---|---|
| 2--001 | 0.82 | 14.02 | 0.44 | 1.25 | 0.028 |
| 2-020 | 0.81 | 14.10 | 0.51 | 1.22 | 0.020 |

Wire Composition
Experimental formulation AN 4 calculated composition:

| C % | Mn % | Cr % | Ni % |
|---|---|---|---|
| 0.932 | 18.77 | 7.67 | 6.39 |

(Calculated to provide a weld composition of 0.80%C, 14.04%Mn, 4.01%Cr, 3.52%Ni)

Actual Weld Analysis:

| | C % | Mn % | Si % | Cr % | Mo % | Ni % | P % |
|---|---|---|---|---|---|---|---|
| Burn 1 | 0.81 | 15.70 | 0.36 | 4.12 | 0.52 | 3.40 | 0.022 |
| Burn 2 | 0.82 | 15.80 | 0.40 | 4.13 | 0.50 | 3.46 | 0.021 |
| Burn 3 | 0.79 | 15.70 | 0.36 | 3.92 | 0.55 | 3.45 | 0.022 |

Cross-Weld Tensile Properties

| Sample No. | Y.S. | T.S. | El. % | R.A. % |
|---|---|---|---|---|
| AT-484-A | 54,999 | 102,000 | 33.5 | 44.9 |
| AT-484-E | 50,000 | 104,000 | 34.0 | 35.0 |

When giving the analysis (chemistry) of the base metal, wire and weld it is understood the remainder or balance (percent by weight) is substantially iron, that is, iron diminished by incidental impurities.

Based on the successful trial weld, pilot production was instituted. However, upon sectioning the initial pilot welds internal cracks were found in the heat affected zone of the base metal (HAZ zone); a typical example is shown in FIG. 2.

Figure 2:
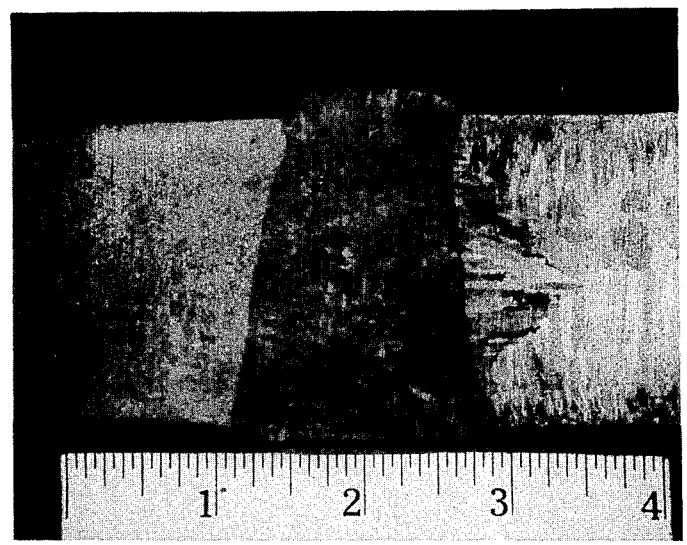
FIG. 2 shows a macro-etched section of an electroslag weld showing internal cracks in the base metal.
Figure 3:
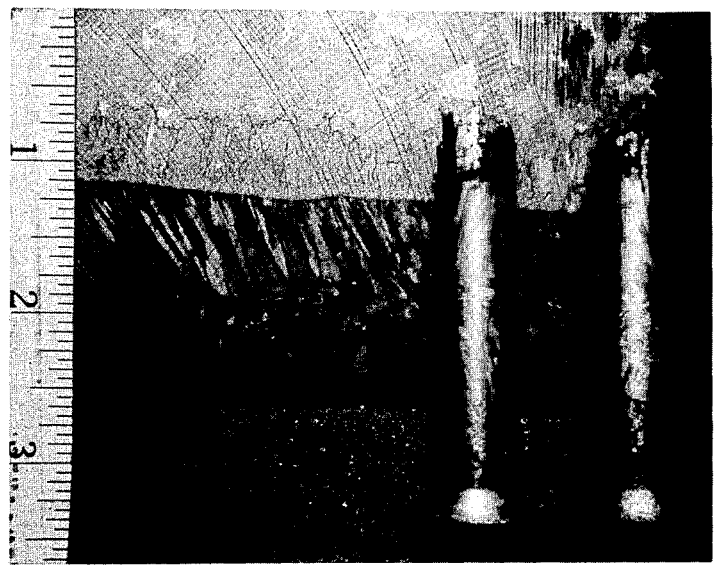
FIG. 3 shows a macro-etched section through an electroslag weld showing cracking in the heat affected zone of the base metal with superimposed cross weld tensile test bars.

Cross weld tensile tests (0.505 inch dia. bars) on the weld shown in FIG. 2 exhibited zero ductility, FIG. 3 and Table 2, but microstructural examination did not reveal any obvious structural embrittlement in the base metal HAZ which would account for cracking. These microstructural observations were confirmed by taking smaller tensile samples (0.242 inch dia. bars) from crack-free regions of the heat affected zone and the weld metal. The tensile tests exhibited very good ductility values (see Table 2) which clearly ruled out the possibility of a heat embrittled microstructure as the cause of the cracking, verifying that we were stabilizing the austenite in the weld by means of nickel in both the weld wire and guide tube, and by molybdenum in the base metal.

TABLE 2

Cross Weld Tensile Tests (.505" Dia. Bars)

| Lab. No. | Y.S. (PSI) | T.S. (PSI) | El. % | R.A. % |
|---|---|---|---|---|
| AU-665-1 | 37,200 | 37,900 | 0 | 2.3 |
| AU-605-2 | 36,600 | 38,200 | 0 | 2.3 |

Results of Tensile Tests With Small Dia. Test Bars (.252" Dia.)

| Lab. No. | Location | Y.S. (PSI) | T.S. (PSI) | El. % | R.A. % |
|---|---|---|---|---|---|
| AU-665-A2 | Weld* | 59,160 | 112,500 | 38.0 | 37.0 |
| AU-665-B1 | H.A.Z.** | 57,000 | 107,800 | 36.0 | 36.4 |

*Tensile bar taken from all-weld metal.
**Tensile bar taken through fusion zone on the fine grained side of the weld.

Figure 4:
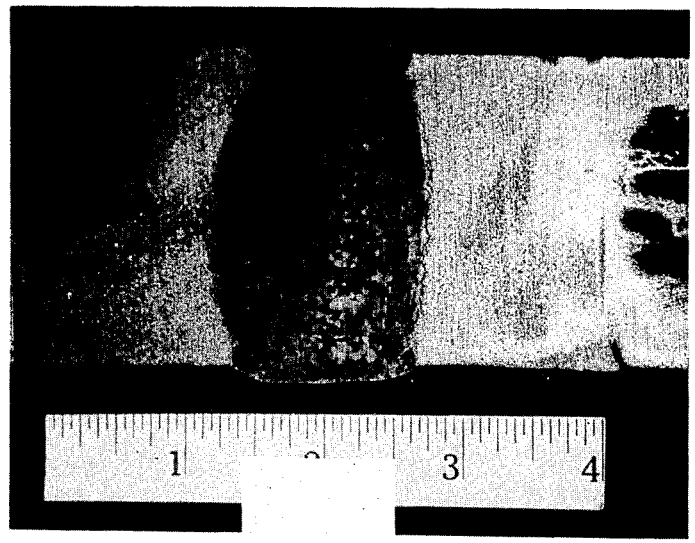
FIG. 4 shows a macro-etched section through an electroslag weld showing hot tears at the interface between the weldment and base metal.

Since the cracks were always located in the coarser grains, further test blocks of base metal were produced with a controlled fine grain structure to determine whether grain size and cracking were related. Additional weldments were produced with these fine grain blocks. Upon sectioning, internal cracks were again revealed, except now the cracks were present on both sides of the fusion zone; an example is shown in FIG. 4.

It will be noted from Table 1 that the amount of phosphorus in the base metal involving the successful experimental weld was 0.028 and 0.020. On the other hand it was found that pilot welds, FIG. 3, was performed on a base having 0.038 phosphorus.

Based on the above, it was suspected that the poor high temperature strength of manganese steel was the problem and high temperature tearing was occuring.

When an electroslag weld solidifies, there is considerable contraction and both the weld deposit and super-heated base metal must possess sufficient strength to withstand the high strain generated by the hindered contraction, otherwise hot tears will result. Contraction is hindered by the mass of the parts being joined.

In the case of manganese steel, higher than normal strains can be generated during solidification of the electroslag weld due to the high coefficient of thermal expansion of manganese steel (deemed to be $1\frac{1}{2}$ times that of ferritic steels). In addition, much steeper temperature gradients will exist causing a higher strain concentration because of the low thermal conductivity of manganese steel (about one-sixth that of pure iron).

This situation is further aggravated due to the relatively poor high temperature strengths of manganese steel especially as the phosphorus content increases. In manganese steel castings with phosphorus contents above 0.06%, phosphide eutectic envelopes can be observed at the grain boundaries which drastically reduce the high temperature ductility of the steel. It has been postulated that at elevated temperatures the eutectic is either soft or completely molten and if a stress is applied while in this temperature range the grains can easily separate wherever the envelope exists. Even below 0.06% phosphorus, where the phosphide eutectic is not visible with an optical microscope, the properties of manganese steel are adversely affected by phosphorus.

Since the degree of hindered contraction and the temperature gradients are more severe with an electroslag weld, increased susceptibility to hot tearing (and a lower tolerance for phosphorus) can be expected in the heat affected zone.

Therefore, after specifying an upper limit for phosphorus of 0.025 to 0.035 in the base metal, three additional welds were produced on a pilot scale, using the stainless steel guide tube and the weld wire identified in Table 1. All three welds were tear-free and excellent ductility values were obtained as shown by Table 3:

TABLE 3
AUTOMATIC WELDING OF MANGANESE STEEL
Test Welds No's 49, 50 and 51

I. Base Metal:

| Heat No. | C % | Mn % | Si % | Cr % | Mo % | P % | Al % |
|---|---|---|---|---|---|---|---|
| 74-018 | 0.79 | 13.20 | 0.52 | 0.64 | 1.02 | .029 | .090 |

II. Welding Parameters:

| | |
|---|---|
| Thickness of Test Plate | 2" |
| Number of Electrodes | 1 |
| Ocillation Distance | 1.5" |
| Root Gap | 3/4" |
| Electrode Wire | 1/16" Dia. |
| Electrode Guide Type | 304 SS |
| Current | 400 Amps |
| Voltage | 37.5 Volts |

III. Cross-Weld Tensile Properties (.505" dia.)

| Sample No. | Yield Strength (PSI) | Tensile Strength (PSI) | El.% | R.A.% |
|---|---|---|---|---|
| 49-A | 56,640 | 101,300 | 25.0 | 32.9 |
| -B | 56,400 | 105,700 | 26.0 | 26.5 |
| 50-A | 54,600 | 113,200 | 35.0 | 37.0 |
| -B | 58,200 | 110,800 | 31.0 | 28.9 |
| 51-A | 56,750 | 117,740 | 37.5 | 38.2 |
| -B | 56,880 | 117,200 | 37.0 | 35.0 |
| -C | 56,400 | 114,500 | 37.0 | 37.7 |

Two additional welds were produced at a higher amperage (450 instead of 400 amps) but both exhibited tears in the HAZ of the base metal. Thus, it was concluded that 2 inch section manganese steel plates could be successfully joined with the electroslag process by operating at 400 amps using a base metal containing a restricted amount of phosphorus.

A small test sample of 5/64 inch diameter weld wire was produced with a lower carbon content to provide 0.60% C instead of 0.80% in the weld. This change was made in order to lower the yield strength of the weld deposit to more closely match the yield strength of the base metal; also a lower yield strength would help to reduce the tearing susceptibility by allowing easier deformation of the weld during cooling and thus promoting a better distribution of induced strain across the total weld joint.

For the initial weld trial with the lower strength wire, low phosphorus (and low aluminum for reasons explained below) were used and the electrical parameters were maintained at 400 amps and 38 volts. A very good weld was produced with excellent cross-weld tensile properties.

In order to determine whether higher amperages could be tolerated with the combination of lower strength wire, low phosphorus and low aluminum, a weld was produced at 500 amps. This weld again provided excellent results and it was therefore concluded the lower strength wire was also acceptable. Later tests with a 3/32 inch diameter wire gave equally good results, 3/32 inch diameter wire being easier to produce than a 5/64 inch wire.

Further experiments established it would not be necessary to oscillate the weld wire while producing the weld, but these same experiments revealed that high residual aluminum in the base metal (0.100%) was producing an effect.

Thus, when some tears were found in the HAZ of the base metal, the only noticeable difference between this and previous tear-free welds was a high residual aluminum content (0.100%). This fact, together with other indications that aluminum could be affecting results, prompted production of a heat of test blocks with both low phosphorus (0.026%) and low aluminum (0.020%).

Several weldments were produced using these low aluminum test blocks (no oscillation) and these welds were found to be tear-free and exhibited good cross-weld tensile properties.

In order to study the influence of aluminum in more detail, a series of test block (base metal) heats was produced at three different aluminum levels: high aluminum (analyzed at >0.14%) low aluminum (0.031%) and zero aluminum (<0.01%). All the test heats contained less than 0.03% phosphorus and the 3/32 inch diameter wire at 400 amps and 38 volts was used for each weld.

Figure 5:
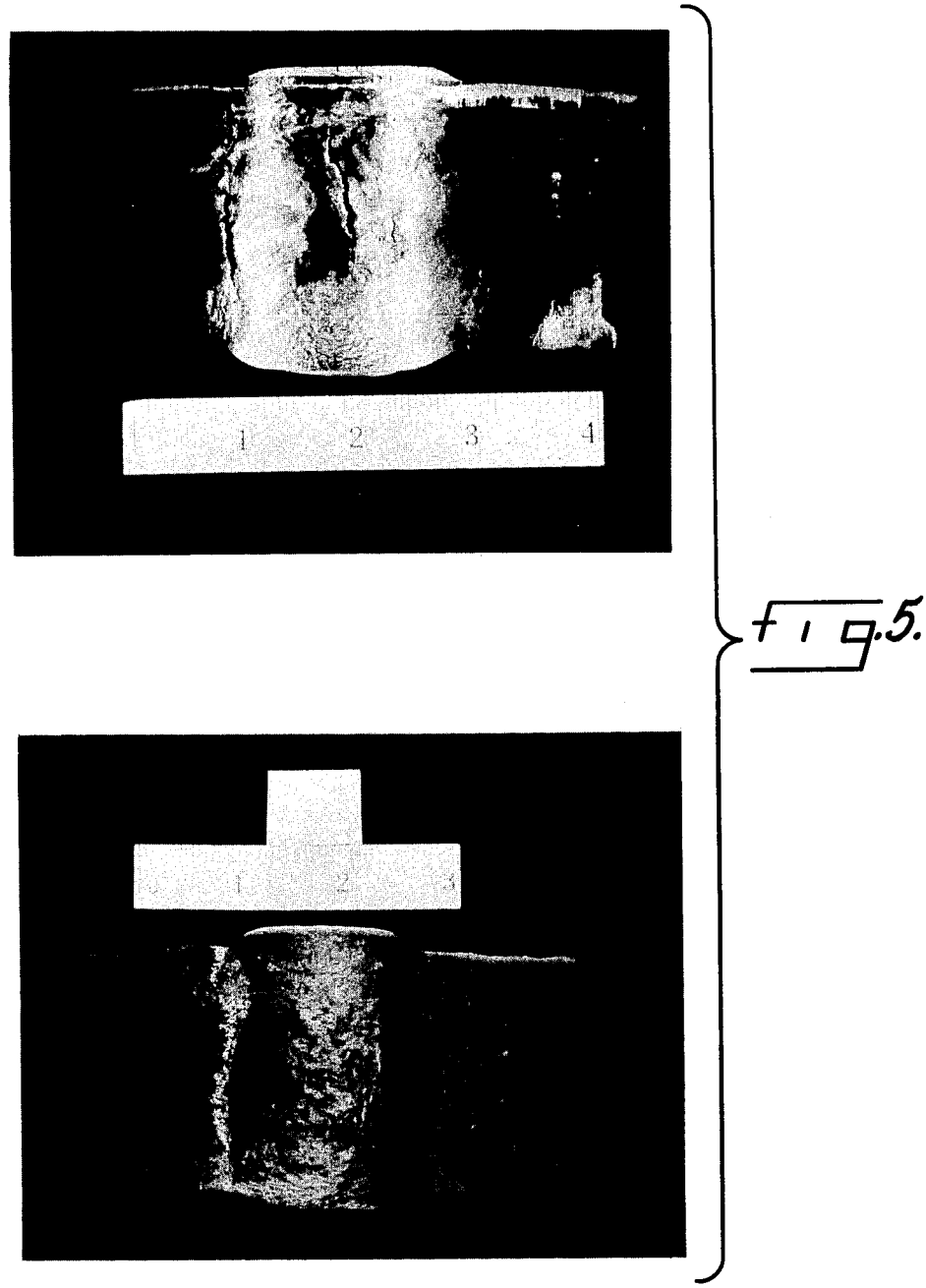
FIG. 5 shows the results of two bend tests on electroslag welds, exhibiting the effect of high aluminum in the base metal on hot tearing.

Upon sectioning the welds; tears were observed in the HAZ of the welds produced with high aluminum test blocks. No tears could be observed in the welds produced with the low or zero aluminum test blocks. Bend tests were performed on each weld and the results are shown in FIGS. 5 and 6. Tensile data on low and zero aluminum welds are shown in Table 4:

TABLE 4

| Weld No. | Cross-Weld Tensile Test Results | | | |
|---|---|---|---|---|
| | Y.S. (PSI) | T.S. (PSI) | El. % | R.A. % |
| 71-A | 53,160 | 99,800 | 30.5 | 36.3 |
| -B | 51,960 | 103,300 | 35.0 | 35.0 |
| -C | 54,480 | 100,600 | 30.0 | 35.4 |
| 72-A | 56,760 | 110,700 | 39.0 | 39.8 |
| -B | 56,400 | 115,000 | 43.0 | 42.2 |

Another weld was produced with the low aluminum, low phosphorus test blocks but in this case the current was raised to 600 amps to determine if higher amperages could be tolerated. Reasonably good bend test results were obtained but some small tears were evident in the base (see FIG. 7). The above data confirms that aluminum does influence the hot tearing tendency.

Good manganese electroslag welds can be produced under the following conditions:
a. Not more than about 0.035% phosphorus in the base metal;
b. Using only small amounts of aluminum for deoxidation of the castings, so the residual aluminum after deoxidation is not more than about 0.05 – 0.06%;
c. Using the lower strength wire; and
d. Maintaining a maximum current of 500 amps.

The process in practice is shown schematically in FIG. 9. The two sections of base metal are separated and the sides are closed by a pair of molds such as graphite or water cooled copper shoes. The guide and weld wire are disposed in the gap between the base metal sections. The weld wire and/or guide tube is used as an electrode, while grounding the base metal sections to establish an electrical couple. In the course of perfecting the weld the weld wire is fed at an appropriate rate. A continuous slag cover is maintained by adding flux from time to time.

RATE OF WELD METAL DEPOSIT; COMPOSITE GUIDE TUBE

Having determined the effect of phosphorus and aluminum, the preference for molybdenum in the base metal and the chemistry for the weld were, welds were tried on a production scale. Two conclusions emerged: (1) embrittlement and tearing are a function of the rate at which weld metal is deposited; and (2) a composite guide, characterized by a copper guide tube inside a stainless steel sleeve, is required for long welds.

Considering first the requirement of a composite guide it was found that in the instance of long seams of the character shown at 15 in FIG. 8 the stainless steel guide tube distorted. A bent guide tube results in erratic arc behavior and uncontrolled weld metal deposit. It was reasoned that distortion was caused by prolonged exposure of the guide tube to high temperature. The problem was further complicated by the fact that stainless steel was desirable as a guide not only because of its compatability with the chemistry of the weld wire, developed after considerable thought and experiments, but also because of its role in maintaining the austentic character of the weld deposit.

Nonetheless the initial use of a carbon steel guide was reevaluated. It was ruled out because a minimum diameter of ½ inch was required for an eight foot weld seam and a diameter of that size would virtually monopolize a ¾ inch gap between sections to be welded, causing arcing.

If the stainless steel guide could be insulated from the effect of the electrical current this would diminish the distortion problem. This was achieved by a decision to use a stainless steel tube as an external supporting sleeve for a copper guide tube, the weld wire in turn being centered in the cooper guide tube. Copper is much weaker structurally than steel but its electrical conductivity and thermal conductivity are vastly superior. Also, copper does not adversely effect the achievement of austenite; indeed copper encourages austenitic stability.

The composite guide thus developed (e.g. a ¼ inch diameter copper guide tube inside a ⅜ inch stainless steel support sleeve) performed admirably. The copper tube employed as the electrode easily carried the current and its structural weakness was obviated by the steel sheath.

The proposition of controlling the rate of deposit within limits, and verification of the effect of phosphorus and aluminum, emerged during a trial run of welds on a production basis. The data are set forth in Table 5.

TABLE 5

| Deposit Rate in/min | % P | % Al | AMPS | Volts | Weld # | Y.S. x 1000 | T.S. x 1000 | % EL | % RA |
|---|---|---|---|---|---|---|---|---|---|
| 0.646 | .027 | <.010 | 500 | 37 | 14 60 | 56–57 | 111–115 | 34–43 | 40–42 |
| 0.934 | .027 | .021 | 500 | 37 | 67 | 55–56 | 110–111 | 39–43 | 40–42 |
| 0.658 | .030 | .046 | 400 | 38 | 51 | 56–57 | 114–118 | 31–37 | 35–38 |
| 0.827 | .026 | .020 | 500 | 38 | 59 | 61–62 | 110–113 | 35–37 | 39–41 |
| 0.805 | .028 | .050 | 400 | 37.5 | H | 50–54 | 102–104 | 33–34 | 35–45 |
| 0.611 | .026 | .020 | 400 | 37.5 | 56 | 57Z–58 | 105–116 | 30–37 | 35–38 |
| 0.896 | .028 | .031 | 500 | 37 | 71 | 52–55 | 100–103 | 30–35 | 35–36 |
| 0.525 | .021 | .044 | 400 | 38 | 55 | 52–54 | 100–103 | 30–35 | 35–36 |
| 0.679 | .030 | .046 | 400 | 37 | 50 | 55–58 | 111–113 | 31–35 | 29–37 |
| 0.688 | .029 | .090 | 400 | 37.5 | 49 | 56–56 | 101–106 | 25–26 | 26–55 |
| 0.538 | .030 | .046 | 400 | 36 | 53 | 54–55 | 95–108 | 21–31 | 27–35 |
| 0.500 | .036 | .074 | 300 | 37 | 39 | 58–59 | 91–111 | 20–34 | 29–34 |
| 0.580 | .026 | .020 | 400 | 38 | 60 | 59–60 | 100–102 | 22—22 | 26–27 |
| 0.954 | .031 | .068 | 725 | 37 | 119 | 54–55 | 80–85 | 19–22 | 24–27 |
| 0.550 | .028 | .070 | 325 | 35 | 20 | 52—52 | 72–85 | 15—15 | |
| 0.500 | .026 | .020 | 400 | 37.5 | 61 | 59—59 | 84–99 | 10–14 | 20–26 |
| 0.318 | .036 | .100 | 325 | 38 | 44 | 53–54 | 64–92 | 9–24 | 12–24 |
| 1.540 | .028 | .080 | 750 | 35 | 19 | 52—52 | 61—61 | 4–5 | 15–16 |
| 1.073 | .028 | .070 | 600 | 35 | 21 | 44–49 | 45–53 | 2–3 | 7–8 |
| 0.846 | .035 | .074 | 430 | 35 | 29 | 57–59 | 57–83 | 1–17 | 1–32 |
| 0.375 | .035 | .057 | 300 | 38 | 43 | 56–57 | 59–75 | 1–9 | 3–17 |
| 0.768 | .037 | .090 | 500 | 37 | 81 | 54–56 | 61–62 | 5—5 | 14–15 |
| 0.803 | .039 | <.010 | 500 | 37 | 80 | 46–48 | 46–50 | 2–3 | 8–9 |
| 0.823 | .036 | .032 | 500 | 37 | 82 | 45–54 | 45–78 | 0–20 | 0–21 |
| 1.600 | .022 | .078 | 750 | 35 | 17 | 37 | 38 | 0 | 0 |
| 0.611 | .032 | .100 | 400 | 38 | 54 | Visible tears | | | |
| 0.780 | .021 | .094 | 425 | 37.5 | 58 | Visible tears | | | |
| 0.792 | .029 | >.14 | 500 | 37 | 69 | Visible tears | | | |
| 0.863 | .029 | <.14 | 500 | 37 | 70 | Visible tears | | | |
| 1.242 | .028 | .031 | 600 | 37 | 74 | Visible tears | | | |
| 1.189 | .028 | .031 | 600 | 37 | 75 | Visible tears | | | |
| 0.783 | .038 | .084 | 500 | 37 | 76 | Visible tears | | | |
| 0.614 | .039 | .032 | 400 | 36 | 92 | Visible tears | | | |
| 0.535 | .036 | .032 | 400 | 36 | 93 | Visible tears | | | |
| 0.511 | .037 | .090 | 400 | 36 | 94 | Visible tears | | | |

| Weld # | Comments | |
|---|---|---|
| 72 | Optimum feed rate, Low P, Low Al | ⎫ |
| 67 | Feed rate a little on high side but P and Al low | |
| 51 | Optimum feed rate, Low P, Low Al | |
| 59 | Optimum feed rate, Low P, Low Al | |
| H | Optimum feed rate, Low P, Low Al | ⎬ Best tensile properties |
| 56 | Optimum feed rate, Low P, Low Al | |
| 71 | Feed rate a little on high side but P and Al low | |
| 55 | Feed rate a little too low but P and Al very low | ⎭ |
| 50 | Optimum feed rate, Low P, Low Al | ⎫ |
| 49 | High Al | |
| 53 | Low feed rate | |
| 39 | Low feed rate - High P | |
| 60 | Low feed rate | |
| 119 | High feed rate; P and Al a little higher than optimum | ⎬ Intermediate (acceptable) tensile properties |
| 20 | Low feed rate | |
| 61 | Low feed rate | |
| 44 | Low feed rate, High P and Al | ⎭ |

TABLE 5-continued

| Deposit Rate in/min | % P | % Al | AMPS | Volts | Weld # | Y.S. x 1000 | T.S. x1000 | % EL | % RA |
|---|---|---|---|---|---|---|---|---|---|
| 19 | Tears - High feed rate | | | | | | | | |
| 21 | Tears - High feed rate | | | | | | | | |
| 29 | Tears - High Phosphorous | | | | | | | | |
| 43 | Tears - High Phosphorous | | | | | | | | |
| 81 | Tears - High Phosphorous | | | | | | | | |
| 80 | Tears - High Phosphorous | | | | | | | | |
| 82 | Tears - High Phosphorus | | | | | | | | |
| 17 | Tears - High feed rate | | | | | | | | |
| 54 | High Al | | | | | | | | |
| 58 | High Al | | | | | | | | |
| 69 | High Al | | | | | | | | Unacceptable tensile properties |
| 70 | High Al | | | | | | | | |
| 74 | High feed rate | | | | | | | | |
| 75 | High feed rate | | | | | | | | |
| 76 | High Phosphorous | | | | | | | | |
| 92 | High Phosphorous | | | | | | | | |
| 93 | High Phosphorous | | | | | | | | |
| 94 | High Phosphorous | | | | | | | | |

Based on the data in Table 5, the upper limit of 0.035% phosphorus is verified and aluminum should be limited to 0.05 to 0.06%, nominal. The electrical parameters may be varied and the gap adjusted for optimum conditions as long as the rate of deposit is in the range of 0.6 to 0.9 inches per minute. A slower speed increases the chance for embrittlement; a higher speed encourages hot tears because of the thermal gradient being too steep, even though embrittlement may not occur. The smaller the gap the faster the rate of deposit, and vice versa, other conditions being equal. Therefore, with a given electrical rate, the gap is adjusted and a feed rate for the wire is selected, which will result in a weld metal deposit within the limit of about 0.6 to 0.9 inches per minute.

Evidence shows that molybdenum when incorporated in the base metal may be as low as a nominal value of 0.4 to 0.6%.

There are many instances where it is also desirable to weld a section of manganese steel to another steel as the opposed section, carbon steel for example. A good example is the preference of welding (rather than bolting) the heel ends of a manganese steel railroad frog to the stock rails which are usually carbon steel. Here, the advantage of manganese steel is essentially its ability to work harden and thereby withstand the impact and work load imposed by the wheels of the train traversing the frog.

There are numerous metallurgical hazards associated with the welding of austenitic manganese steel to a 0.70% carbon steel. The relatively high carbon content of rails for example is an adverse factor since it is generally considered that any welding on steels with more than 0.30% carbon will require preheating, interpass temperature control, special welding techniques and post-heating. Since the higher carbon steels tend to have a much higher hardness in the heat affected zone of welds due to martensite formation, they are more likely to crack. The metallurgical problems are further compounded with the introduction of a highly alloyed weld deposit necessary to provide the required compatibility with austenitic manganese steel.

Thermit welding using manganese steel thermit powders was deemed inappropriate because of the difficulty in controlling weld penetration of the manganese side of the weld which has a lower melting point than carbon steel.

It was not possible initially to obtain good manganese steel/carbon steel welds using the same electroslag welding parameters found adequate for joining manganese to manganese. Difficulties arose because of the differences in the melting point and thermal conductivity of the two materials which created a different overall thermal balance than that obtained with manganese steel welds. When using the optimum electroslag welding parameters developed for manganese steel, incomplete fusion occurred at the carbon steel/weld interface; this is illustrated in FIG. 10.

For complete fusion, the temperature of the slag pool must exceed the melting point of the base metal. In a carbon steel/manganese steel weld, a much greater quantity of heat is being pulled away by the carbon steel (thermal conductivity 3.5 times greater than manganese steel), and thus an increased heat input is required to compensate for this loss. Also, a higher slag pool temperature is ncessary to fuse the 0.7% carbon steel since the melting point of that carbon steel for example is over 100° F higher than that of manganese steel.

Figure 10:
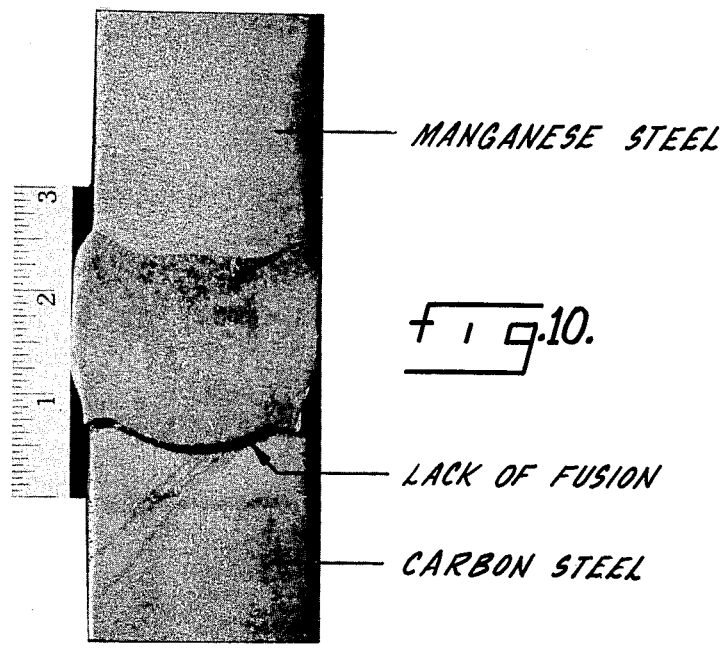

For the weld shown in FIG. 10 a welding current of 500 amps did not provide sufficient heat input to completely fuse the carbon steel. Therefore, in order to provide a higher slag pool temperature, it was necessary to increase the welding current.

Using welding currents in excess of 600 amps, complete fusion of the carbon steel was obtained, but hot tears occurred in the manganese steel section. The current is controlled by the feed rate and thus at higher currents the vertical travel speed is also increased. With currents above 600 amps, the vertical travel speed exceeds the rate of 0.9 in./min. presently deemed necessary to prevent hot tearing in the manganese steel section.

Figure 11:
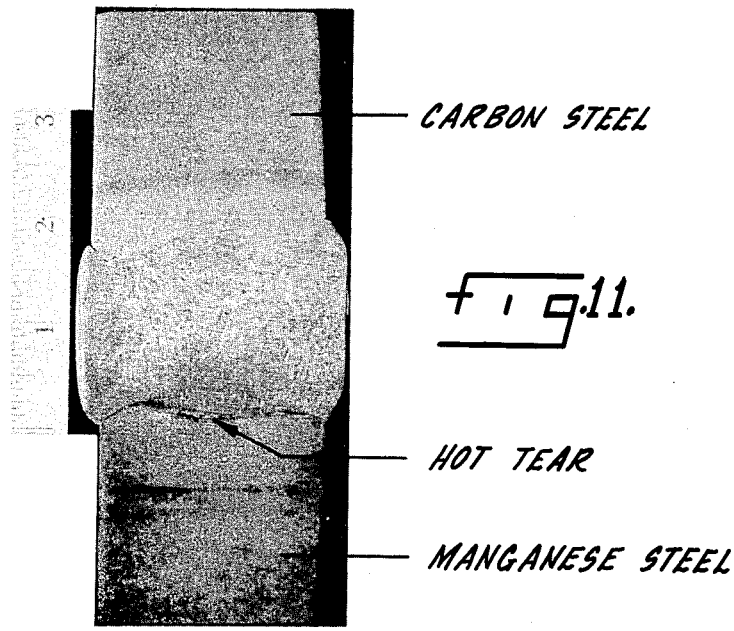
FIGS. 10 and 11 show defective welds when joining manganese steel to carbon steel.

An example of this is shown in FIG. 11. A current of 600 amps was used for this weld, which is borderline for obtaining complete fusion of the carbon steel. Even though the vertical speed only slightly exceeded 0.9 in./min., a small tear occurred in the opposed section of austenitic manganese steel.

Figure 12:
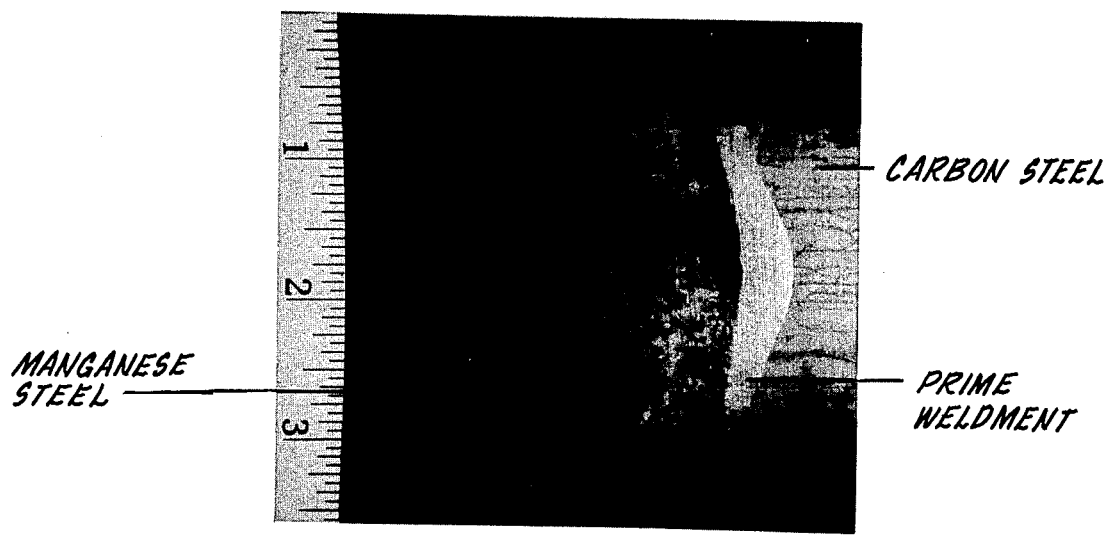
FIG. 12 shows a staged weld.

A solution to these opposing factors was found by using a two-stage welding procedure, as illustrated in FIG. 12.

Thus, a priming or "butter" layer of weld metal was first deposited by the present electroslag process on the carbon steel using a high current of 650 amps to obtain good fusion. This weldment was then joined to the manganese steel by the present electroslag process using a lower current of 500 amps and optimum travel speed. As can be seen, complete fusion of the carbon steel was obtained and no tears occurred in the manganese steel.

TABLE 6

Two-Stage Welding Procedure:
(1) ¾" "butter" layer of weld wire metal deposited on 2" section C-steel. 650 amps, 38 volts, travel speed 1.10 in./min.
(2) Weldment (1) joined to 2" section MOL* grade Mn steel. 500 amps, 37 volts, gap ¾" travel speed .69 in./min.

TABLE 6-continued

| Sample No. | Condition | Y.S. (psi) | T.S. (psi) | El % | % R.A. Mn Weld | % R.A. C-steel |
|---|---|---|---|---|---|---|
| 1A | As Welded | 53,160 | 89,600 | 13.0 | 32.6 | 8.6 |
| 1B | As Welded | 54,000 | 87,600 | 10.0 | 32.6 | 8.6 |
| 2A | Tempered 900° F-½ Hr-Ac | 57,360 | 88,200 | 10.0 | 31.2 | 9.3 |
| 2B | " | 56,880 | 104,500 | 15.0 | 45.0 | 3.2 |

*MOL grade is in-house designation corresponding to ASTM A128, Grade E-1 mentioned earlier The "butter" or prime layer approach is of course only a staged progression of the process to avoid tearing of the manganese steel section. However, in view of the additional welding step involved, other approaches were evaluated using only a one-step process.

A final solution in this regard was found by using a wider root gap. In the development described above for joining manganese steel to manganese steel by electroslag welding, it was determined that a narrow gap helped reduce the heat input and thereby prevent overheating and carbide embrittlement of the manganese base metal. However, there is a different thermal balance with a carbon steel/manganese steel weld joint since additional heat is being pulled away by the carbon steel. In view of this higher heat loss, it was reasoned that the heat input could be increased if the more heat resistant 1% Mo-Manganese grade was used, the so-called MOL grade.

The root gap was increased from ¾ inch to 1-⅛ inch and this allowed the use of higher amperages without an increase in the vertical travel speed — the feed rate of the wire is higher but the vertical travel speed remains "constant" since a bigger gap is being filled.

Figure 13:
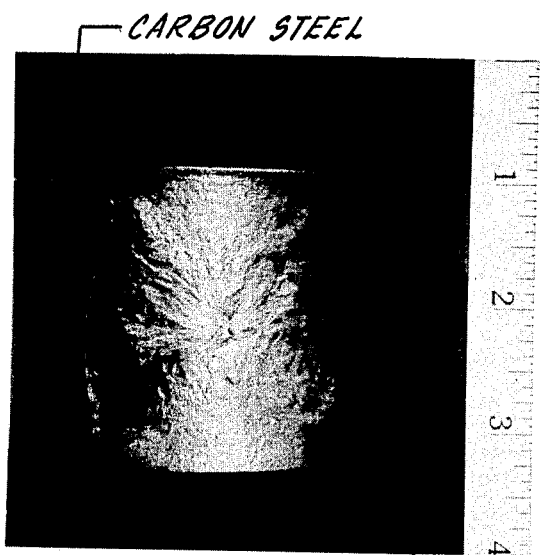
FIGS. 13 and 14 show acceptable welding of manganese steel to carbon steel.
Figure 14:
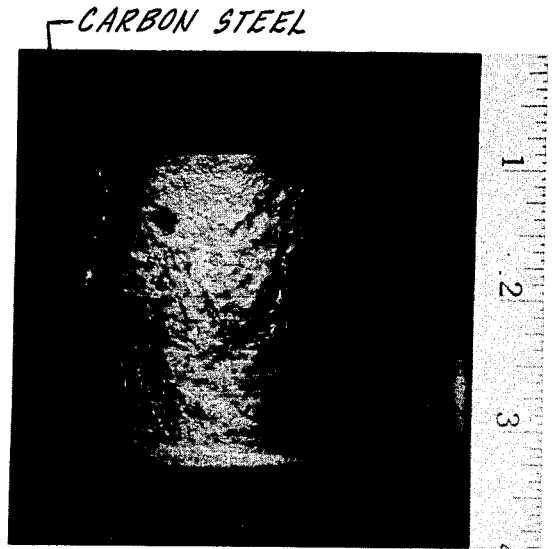

Using these welding parameters (MOL grade and the larger gap) high quality manganese steel/0.7% C steel welds were produced, as shown in FIGS. 13 and 14.

As denoted in FIGS. 13 and 14 the carbon steel in both instances was 0.7% carbon; only the current and feed rate of the guide assembly varied. 2 inch test bar sections were also joined by the same welding procedure with the following results:

TABLE 7

2" Section 0.70% C Steel and MOL Grade Mn Steel;
Gap 1-⅛", 700 Amps, 40 Volts, Travel Speed 0.80 in./min.

| Sample No.: | | 12-1 | 12-2 | 12-3 |
|---|---|---|---|---|
| Tensile Test Location: | | Weld Metal | MOL Fusion Zone | C-Steel Fusion Zone |
| Yield Strength (psi) | (A) | 51,720 | 52,800 | 51,360 |
| | (B) | 51,600 | 51,840 | 51,240 |
| Tensile Strength (psi) | (A) | 69,800 | 76,000 | 64,400 |
| | (B) | 72,700 | 68,200 | 75,300 |
| % Elongation | (A) | 11.0 | 18.5 | 8.0 |
| | (B) | 14.0 | 13.5 | 10.5 |
| % Red. of Area | (A) | 19.2 | 27.8 | 17.0 |
| | (B) | 26.9 | 22.3 | 19.5 |

Results on 0.70% C Steel (For Comparison)

| | Yield Strength | Tensile Strength | % El | % RA |
|---|---|---|---|---|
| (A) | 50,400 | 118,200 | 11.5 | 14.5 |
| (B) | 50,040 | 109,400 | 4.5 | 6.6 |

TABLE 8

2" Section 0.7% C Steel and MOL Grade Mn Steel;
Gap 1⅛", 650 Amps, 40 Volts, Travel Speed 0.70 in./min.

| Sample No.: | | 13-1 | 13-2 | 13-3 |
|---|---|---|---|---|
| Tensile Test Location: | | Weld Metal | MOL Fusion Zone | C-Steel Fusion Zone |
| Yield Strength (psi) | (A) | 51,240 | 50,280 | 52,440 |
| | (B) | 48,600 | 46,530 | 52,320 |
| Tensile Strength (psi) | (A) | 61,400 | 64,800 | 64,300 |
| | (B) | 66,400 | 51,800 | 63,000 |
| % Elongation | (A) | 5.0 | 13.5 | 4.0 |
| | (B) | 10.5 | 7.0 | 4.5 |
| % Red. of Area | (A) | 9.6 | 22.7 | 9.2 |
| | (B) | 20.6 | 14.1 | 10.4 |

Practices will vary from several standpoints, whether welding manganese steel to manganese steel, or manganese steel to another steel: chemical analysis of the base metal sections (whether circumstances demand the MOL-grade and/or severe limitations on phosphorus and/or aluminum) the feed rate, the root gap, and so on. Selection will depend upon the requirements of the ultimate user, which is to say that there may be situations where mechanical properties less than optimum may be tolerated, in which event the MOL-grade, for example, may not be needed.

The "butter" layer need not necessarily be deposited by electroslag welding but could be deposited by arc welding. When the sections are not high (short weld metal seams) it may not always be necessary to employ the copper tube because the stainless steel sleeve, acting as a guide for the weld wire, may be enough.

For optimum mechanical properties in the weld metal the preferred manganese steel section (nominal composition) is:

| C | Mn | Si | Mo | P | Al |
|---|---|---|---|---|---|
| 0.8 | 14 | 0.4 | 1.2 | 0.035 max | 0.035 max |

For long (high) seams, the preferred guide assembly is a copper tube inside a stainless steel sleeve. Working examples for the weld wire are:

| C | Mn | Cr | Ni |
|---|---|---|---|
| 0.93 | 18.77 | 7.67 | 6.39 |
| 0.55 | 20.56 | 8.38 | 6.99 |

There would be a preference for the weld wire with the lesser amount of carbon for reasons given above (to match the yield strengths), a preference which again applies whether welding manganese steel to manganese steel or that steel to another steel.

To maintain the austenitic integrity of the weld metal considerable variation is possible amongst the austenite stabilizers which are manganese, nickel, copper and carbon. As already noted, there may be some welds where the copper tube may be omitted. Regarding carbon our working examples with the carbon in the weld wire already as low as 0.55 leave little doubt the carbon level in the weld wire may reach as low as 0.40 and indeed suggest that for certain applications the following additional all-weld-metal specifications would be acceptable for the weld wire:

| C | Mn | Cr | Ni | Fe |
|---|---|---|---|---|
| 0.25/0.35 | 15/17 | 15/17 | 0.8/1.2 | balance |

-continued

| C | Mn | Cr | Ni | Fe |
|---|---|---|---|---|
| 0.25/0.35 | 14/16 | 14/16 | 0.8/1.2 | balance |

Accordingly, the following weld wire range is deemed appropriate:

| C | Mn | Cr | Ni | Fe |
|---|---|---|---|---|
| 0.25/1.15 | 14/20.5 | 6/17 | 0.8/8 | balance, substantially |

As for the other steels which may be joined to manganese steel by the present process, the process would doubtless be applicable to T1 steel and low alloy steels such as 4340 steel (1.85 Ni, 0.8 Cr, 0.25 Mo, 0.4 C) indeed ordinarily easier to weld than carbon steel. By "carbon steel "0 is meant plain unalloyed steel, a well known term in the metallurgical arts which is equally true of "low alloy " steel.

We claim:

1. A method for joining sections of austenitic manganese steel by welding comprising:
   A. separating the sections to afford a gap therebetween;
   B. disposing in the gap a coaxially related weld wire and guide for the weld wire;
   C. consumming the weld wire and guide by the electroslag process progressively to deposit weld metal to join the sections, the sides of the base metal facing the gap melting to contribute manganese steel to the weld;
   D. the guide and weld wire being constituted to contribute austenite stabilizers selected from the group consisting of manganese, nickel and copper, together with at least about 0.55% carbon in the weld wire, in amounts adequate to maintain substantially the austenitic integrity of the weld metal; and
   E. maintaining a gap width and weld wire feed rate such that the weld metal deposits at a rate sufficiently rapid to avoid embrittlement in the heat affected zone.

2. A method according to claim 1 in which the base metal contains molybdenum.

3. A method according to claim 1 in which the base metal contains not more than about 0.035% phosphorus and not more than about 0.05 to 0.06% aluminum.

4. A method according to claim 1 in which the austenite stabilizers include nickel in the weld wire and in the guide.

5. A method according to claim 1 in which the weld wire analysis is in the following range:
   C: 0.55 to 1.15
   Mn: 16.5 to 20.5
   Cr: 6 to 10
   Ni: 5 to 8
   Fe: balance, substantially
   and in which the guide is a tube of copper inside a sleeve of stainless steel.

6. A method according to claim 5 in which the base metal contains molybdenum and not more than 0.035% phosphorus.

7. A method according to claim 5 in which the base metal contains molybdenum and not more than about 0.05 to 0.06% aluminum.

8. A method for joining sections of austenitic manganese steel by welding comprising:
   A. separating the sections to afford a gap therebetween;
   B. disposing in the gap a coaxially related weld wire and guide for the weld wire;
   C. consumming the weld wire and guide by the electroslag process progressively to deposit weld metal to join the sections, the sides of the base metal facing the gap melting to contribute manganese steel to the weld, and the guide and weld wire being constituted to contribute austenite stabilizers selected from the group consisting of manganese, nickel and copper, together with at least about 0.55% carbon in the weld wire, in amounts adequate to maintain substantially the austenitic integrity of the weld metal; and
   D. adjusting the width of the gap and feeding the weld wire at a rate such that the weld metal deposit progresses at a rate of between 0.6 and 0.9 inches per minute.

9. A method according to claim 8 in which the base metal contains molybdenum.

10. A method according to claim 8 in which the base metal contains not more than about 0.035% phosphorus and not more than about 0.05 to 0.06% aluminum.

11. A method according to claim 8 in which the austenite stabilizers include nickel in both the weld wire and guide.

12. A method according to claim 8 in which the weld wire analysis is in the following range:
    C: 0.55 to 1.15
    Mn: 16.5 to 20.5
    Cr: 6 to 10
    Ni: 5 to 8
    Fe: balance, substantially
    and in which the guide is a copper tube inside a stainless steel sleeve.

13. A method according to claim 8 in which the base metal contains not more than about 1% molybdenum, not more than about 0.035% phosphorus, not more than about 0.05 to 0.06% aluminum and about 0.8% carbon.

14. A method for joining sections of austenitic manganese steel by welding comprising:
    A. separating the sections to afford a gap therebetween;
    B. disposing in the gap a coaxially related weld wire and guide for the weld wire, the guide and weld wire together contributing austenite stabilizers selected from the group consisting of manganese, nickel and copper, along with at least about 0.55% carbon in the weld wire, in amounts to maintain austenitic integrity of the weld metal;
    C. consumming the weld wire and guide by the electroslag process progressively to deposit weld metal to join the sections, the sides of the base metal facing the gap melting to contribute manganese steel to the weld; and
    D. adjusting the gap and feeding the weld wire at a rate such that the deposit of weld metal progresses at the rate of at least about 0.6 inches per minute.

15. A method according to claim 14 in which the base metal contains molybdenum.

16. A method according to claim 14 in which the base metal contains not more than about 0.035% phosphorus and not more than about 0.05 to 0.06% aluminum.

17. A method according to claim 14 in which the weld wire analysis is in the following range:
    C: 0.55 to 1.15
    Mn: 16.5 to 20.5

Cr: 6 to 10
Ni: 5 to 8
Fe: balance, substantially

18. A method according to claim 14 in which the base metal contains not more than about 1% molybdenum, not more than about 0.035% phosphorus and not more than about 0.05 to 0.06% aluminum.

19. A method according to claim 14 in which the guide for the weld wire comprises a copper tube inside a stainless steel sleeve.

20. A method according to claim 18 in which the guide for the weld wire comprises a copper tube inside a stainless steel sleeve.

21. In the method of joining base metal sections by electroslag welding, in which a weld wire is fed into the gap between the sections, the step of centering the weld wire in a copper guide tube employed as the electrode and supporting the guide tube inside a sleeve of stainless steel, whereby the copper tube, as the weaker member, may carry the current while supported by the stronger steel sleeve, whilst the stronger steel sleeve need not be structurally distorted by the heat of the current during welding and, during welding, contributes alloy ingredients to the weld metal.

22. The method of claim 21 including the step of adjusting the gap and feeding the weld wire at a rate such that weld metal deposit progresses at the rate of about 0.6 to 0.9 inches per minute.

23. The method of claim 22 in which one of the base metals is manganese steel containing not more than about 0.035% phosphorus and not more than about 0.05 to 0.06% aluminum.

24. A method for joining a section of austenitic manganese steel, containing at least about 10% manganese, to an opposed section of steel by electroslag welding and comprising:
   A. separating the steel sections to afford a gap therebetween;
   B. disposing in the gap a coaxially related weld wire and guide for the weld wire;
   C. consumming the weld wire and guide by the electroslag process progressively to deposit weld metal to join the sections, the sides of each base metal section facing the gap melting to contribute metal to the weld and the manganese steel section in particular contributing manganese steel to the weld;
   D. the guide and weld wire being constituted to contribute at least one austenite stabilizer selected from the group consisting of manganese, nickel and copper in an amount which, together with at least about 0.25% carbon in the weld wire, is adequate to maintain substantially the austenitic integrity of the manganese steel in the weld metal; and
   E. maintaining a gap width and weld wire feed rate such that the weld metal deposits at a rate sufficiently rapid to avoid deleterious embrittlement in the heat affected zone of the manganese steel section.

25. A method according to claim 24 in which the manganese steel section contains molybdenum.

26. A method according to claim 24 in which the opposed steel section is carbon steel.

27. A method according to claim 25 in which the opposed steel section is carbon steel.

28. A method according to claim 24 in which the austenite stabilizer includes nickel in the weld wire and in the guide.

29. A method according to claim 26 in which the austenite stabilizer includes nickel in the weld wire and in the guide.

30. A method according to claim 29 in which the weld wire analysis is in the following range:
C: 0.25 to 1.15
Mn: 14 to 20.5
Cr: 6 to 17
Ni: 0.8 to 8
Fe: balance, substantially
and in which the guide is a tube of copper inside a sleeve of stainless steel.

31. A method according to claim 24 in which the guide is a tube of copper inside a sleeve of stainless steel.

32. A method according to claim 26 in which the guide is a tube of copper inside a sleeve of stainless steel.

33. A method for joining sections of steel, of which at least one is necessarily manganese steel containing at least 10% manganese, by the electroslag welding process and comprising:
   A. separating the steel sections to afford a gap therebetween;
   B. disposing in the gap a coaxially related weld wire and guide for the weld wire, the guide and weld wire together contributing at least one austenite stabilizer selected from the group consisting of manganese, nickel and copper in an amount which, combined with an amount of at least about 0.25% carbon in the weld wire, substantially maintains the austenitic integrity in the weld metal;
   C. consumming the weld wire and guide by the electroslag process progressively to deposit weld metal to join the sections, the sides of the two steel sections facing the gap melting to contribute manganese steel to the weld; and
   d. adjusting the gap and feeding the weld wire at a rate such that the deposit of weld metal progresses at the rate of at least about 0.6 inches per minute.

34. A method according to claim 33 in which the other steel section is carbon steel.

35. A method according to claim 34 in which the manganese steel section contains molybdenum.

36. A method according to claim 33 in which the weld wire analysis is in the following range:
C: 0.25 to 1.15
Mn: 14 to 20.5
Cr: 6 to 17
Ni: 0.8 to 8
Fe: balance, substantially 37. A method according to claim 33 in which the guide for the weld wire comprises a copper tube inside a stainless steel sleeve.

38. A method according to claim 34 in which the guide for the weld wire comprises a copper tube inside a stainless steel sleeve.

39. In the method of joining two steel sections by electroslag welding, at least one steel section being manganese steel and in which a weld wire is fed into the gap between the sections, the step of centering the weld wire in a copper guide tube employed as the electrode and supporting the guide tube inside a sleeve of stainless steel, whereby the copper tube, as the weaker member, may carry the current while supported by the stronger steel sleeve, whilst the stronger steel sleeve need not be structurally distorted by the heat of the current during welding and during welding, contributes alloy ingredients to the weld metal.

40. The method of claim 39 including the step of adjusting the gap and feeding the weld wire at a rate such that weld metal deposit progresses at the rate of about 0.6 to 0.9 inches per minute.

41. The method of claim 39 in which the other steel section is carbon steel.

42. The method of claim 40 in which the other steel section is carbon steel.

* * * * *